(12) United States Patent
Kawamata

(10) Patent No.: US 9,654,658 B2
(45) Date of Patent: May 16, 2017

(54) INCREASING THE CURRENT SUPPLIED TO A DRIVE MOTOR OF AN IMAGE FORMING APPARATUS WHEN THE COVER OF THE IMAGE FORMING APPARATUS IS IN AN OPEN STATE

(71) Applicant: Brother Kogyo Kabushiki Kaisha, Nagoya-shi, Aichi-ken (JP)

(72) Inventor: Noriyuki Kawamata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/985,547

(22) Filed: Dec. 31, 2015

(65) Prior Publication Data
US 2016/0212286 A1   Jul. 21, 2016

(30) Foreign Application Priority Data
Jan. 15, 2015   (JP) ................. 2015-005546

(51) Int. Cl.
*H04N 1/00* (2006.01)
*B41J 29/38* (2006.01)

(52) U.S. Cl.
CPC .......... *H04N 1/00795* (2013.01); *B41J 29/38* (2013.01); *H04N 1/00551* (2013.01); *H04N 1/00559* (2013.01)

(58) Field of Classification Search
CPC .......... H04N 1/00795; H04N 1/00551; H04N 1/00559; H04N 1/00652; H04N 1/00657;
(Continued)

(56) References Cited

U.S. PATENT DOCUMENTS 8,760,731 B2 * 6/2014 Wilsher ............ H04N 1/00814
                                                     358/474
9,049,327 B2   6/2015 Xu et al.
(Continued)

FOREIGN PATENT DOCUMENTS

JP   2000-354136 A   12/2000
JP   2001-092045 A    4/2001
(Continued)

OTHER PUBLICATIONS

English language machine translation of JP 2001-092045 A to Kashiwabara.*

*Primary Examiner* — Eric A Rust
(74) *Attorney, Agent, or Firm* — Banner & Witcoff, Ltd.

(57) ABSTRACT

An image reading apparatus includes: a housing; a first supporter having a document support surface; a cover switchable between a closed state for covering the support surface and a spaced state for exposing the support surface; a driving device for generating a driving force; a mover movable by the driving force; and an image reader supported by the mover to perform a reading operation. A controller obtains first information that changes depending upon change in a magnitude of a force acting on the support surface. The controller determines, based on the obtained first information, whether the driving device generates the driving force based on a first driving manner or a second driving manner different from the first driving manner, as a driving manner of the driving device. The controller controls the driving device to generate the driving force based on a determined driving manner.

13 Claims, 10 Drawing Sheets

(58) Field of Classification Search
CPC ... H04N 2201/0454; H04N 2201/3335; H04N 1/33323
USPC .......................................... 358/486; 399/396
See application file for complete search history.

(56) References Cited

U.S. PATENT DOCUMENTS

2004/0174515 A1* 9/2004 Votipka ................. G03B 27/62
355/75
2014/0153068 A1   6/2014 Xu et al.
2014/0226172 A1* 8/2014 Kadobayashi ..... H04N 1/00896
358/1.13

FOREIGN PATENT DOCUMENTS

| JP | 2006-191393 A | 7/2006 |
| JP | 2007-003667 A | 1/2007 |
| JP | 2014-110439 A | 6/2014 |

* cited by examiner

INCREASING THE CURRENT SUPPLIED TO A DRIVE MOTOR OF AN IMAGE FORMING APPARATUS WHEN THE COVER OF THE IMAGE FORMING APPARATUS IS IN AN OPEN STATE

CROSS REFERENCE TO RELATED APPLICATION

The present application claims priority from Japanese Patent Application No. 2015-005546, which was filed on Jan. 15, 2015, the disclosure of which is herein incorporated by reference in its entirety.

BACKGROUND

Technical Field

The following disclosure relates to an image reading apparatus.

Description of the Related Art

There is known an image reading apparatus including a housing, a supporter, a cover, a driving device, a mover, and a reading device. The housing has a bottom surface. The supporter is a platen glass supported by the housing so as to be spaced apart from the bottom surface. The supporter has a support surface for supporting a document. This support surface is an opposite side of the supporter from its surface facing the bottom surface. The cover is supported by the housing so as to be switchable between a closed state in which the cover covers the support surface and a spaced state in which the cover is spaced apart from the support surface. The driving device includes: an electric motor for generating a driving force based on a set driving condition; and gears one of which is meshed with the electric motor. The mover is coupled to the driving device by a pulley and a timing belt. A guide shaft is disposed on the bottom surface of the housing, and the mover is guided by this guide shaft in a sub-scanning direction. The reading device is supported by the mover.

In this image reading apparatus, when the mover is moved in the sub-scanning direction between the bottom surface and the supporter by the driving force transmitted from the driving device, the reading device is also reciprocated with the mover. During this reciprocation in a main scanning direction, the reading device reads an image formed on the document supported on the support surface, while being moved in the sub-scanning direction. Through this reading operation, the image reading apparatus reads the entire image formed on the document.

SUMMARY

Incidentally, a load acts on the support surface in some eases in the conventional image reading apparatus. Specifically, in the case where a thick book is placed on the supporter to read a portion of the book as a document, a load may act on the support surface due to the weight of the book and/or a user operation of pressing the book onto the support surface. In the case where a curled document is placed on the supporter, a load may act on the support surface by a user operation of pressing the document onto the support surface to remove the curl of the document. If the supporter is bent due to such a load, a resistance may act on the mover being moved under the supporter, which may cause the mover to be changed in speed or stopped. The changes in speed or the stop of the mover leads to malfunctions such as misreading of image by the reading device and interruption of the reading operation, making it impossible to stably perform the reading operation.

Accordingly, an aspect of the disclosure relates to an image reading apparatus capable of performing a reading operation well and stably even in the case where a load acts on a support surface.

In one aspect of the disclosure, an image reading apparatus includes; a housing having a bottom surface; a first supporter supported by the housing so as to be spaced apart from the bottom surface, the first supporter having a support surface that supports a document; a cover supported by the housing and switchable between a closed state in which the cover covers the support surface and a spaced state in which the cover is spaced apart from the support surface; a driving device configured to generate a driving force; a mover movable in a space between the bottom surface and the first supporter in a first direction by the driving force transmitted from the driving device; an image reader supported by the mover; and a controller configured to control the image reader and the driving device to perform a reading operation in which the image reader reads an image formed on a document supported by the support surface. The controller is configured to perform: obtaining first information that changes depending upon change in a magnitude of a three acting on the support surface; determining, based on the obtained first information, whether the driving device generates the driving force based on a first driving manner or a second driving manner different from the first driving manner, as a driving manner of the driving device; and controlling the driving device to generate the driving force based on a determined one of the first driving manner and the second driving manner.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described embodiments by reference to the drawings.

First Embodiment

Figure 1:
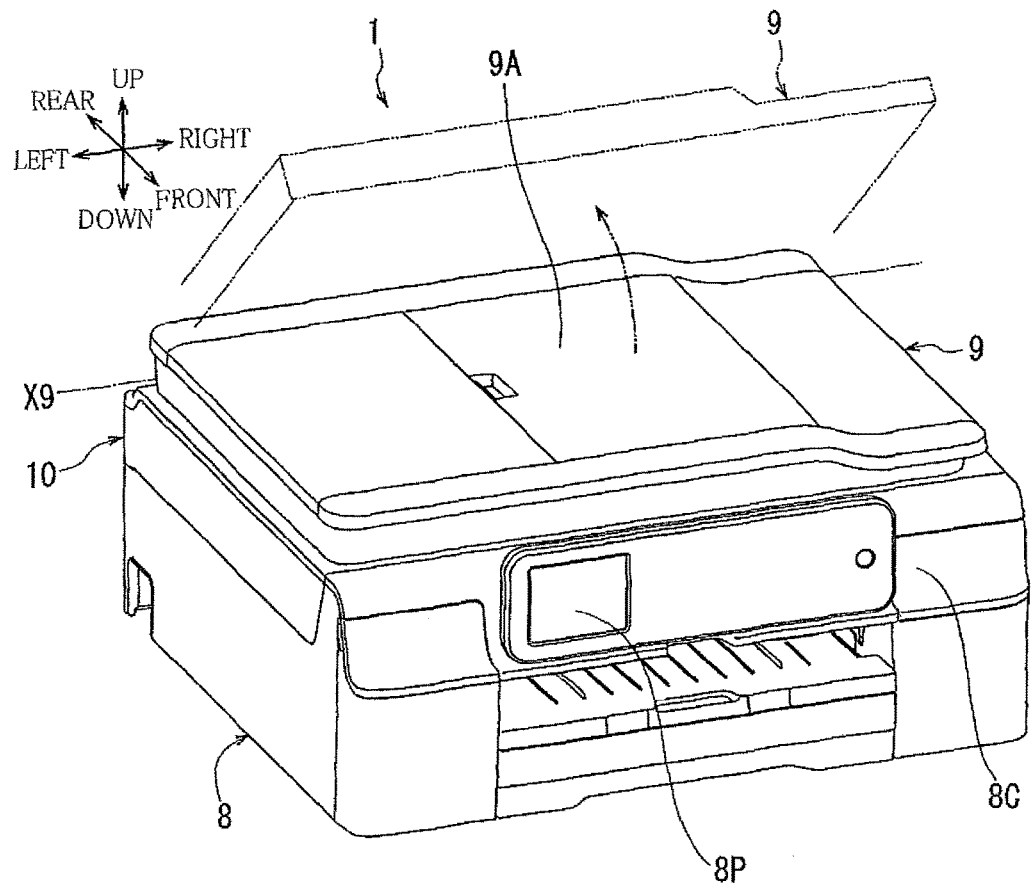
FIG. 1 is a perspective view of an image reading apparatus according to the first embodiment.
Figure 9:
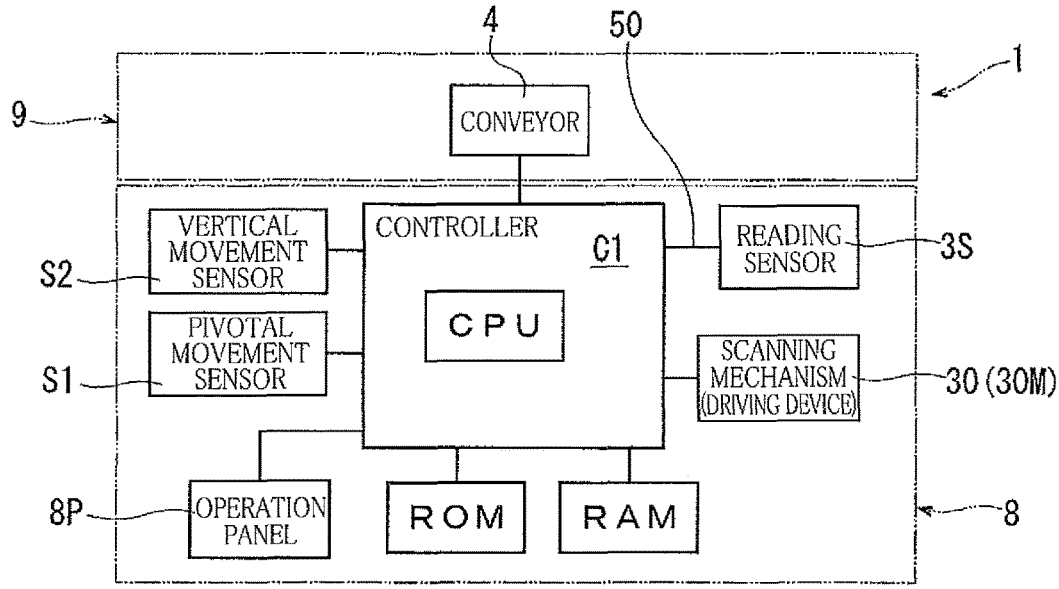
FIG. 9 is a block diagram illustrating the image reading apparatus.

FIG. 1 illustrates image reading apparatus 1 according to a first embodiment. In FIG. 1, a side of an image reading apparatus on which an operation panel 8P is provided is defined as a front side, and the other sides and front, rear, left, right, up, and down directions are defined assuming the image reading apparatus 1 is viewed from the front side.
Overall Construction As illustrated in FIGS. 1-5, the image reading apparatus 1 includes a main body 8, a cover 9, an image forming unit 5, a reading unit 3, and a conveyor 4. The main body 8 is shaped like a flat box. As illustrated in FIG. 1, a front surface of the main body 8 is provided with the operation panel 8P in the form of a touchscreen, for example. As illustrated in FIGS. 3 and 9, the image reading apparatus 1 includes a controller C1. The controller C1 is provided in the main body 8 so as to extend in the up and down direction along a right surface of the main body 8. The controller C1 controls the image forming unit 5, the reading unit 3, the conveyor 4, and the operation panel 82.

Figure 2:
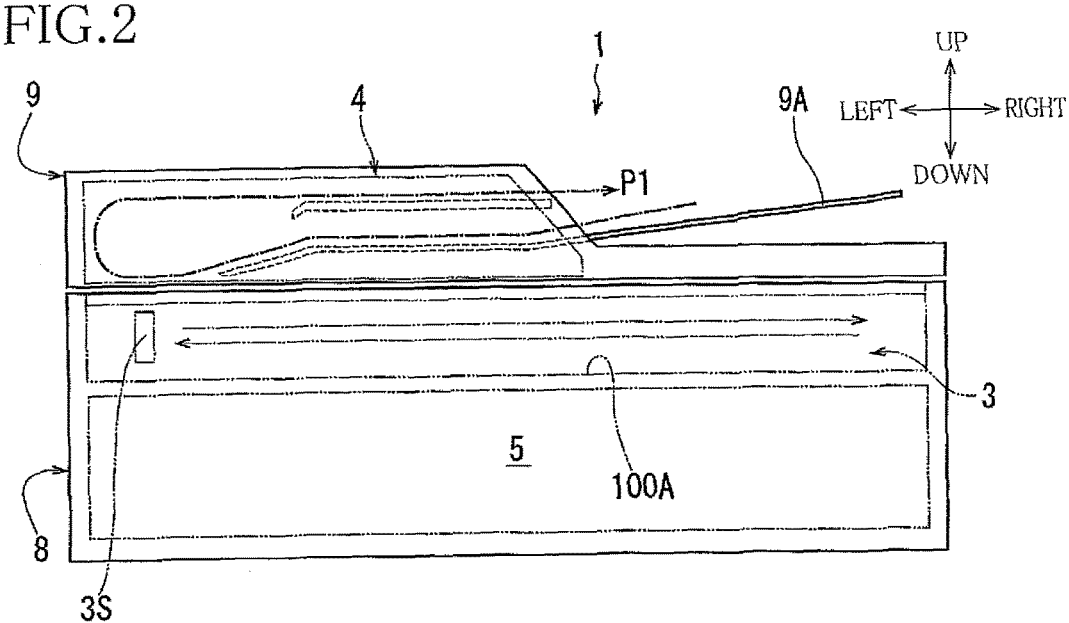
FIG. 2 is a schematic front elevational view of the image reading apparatus.
Figure 3:
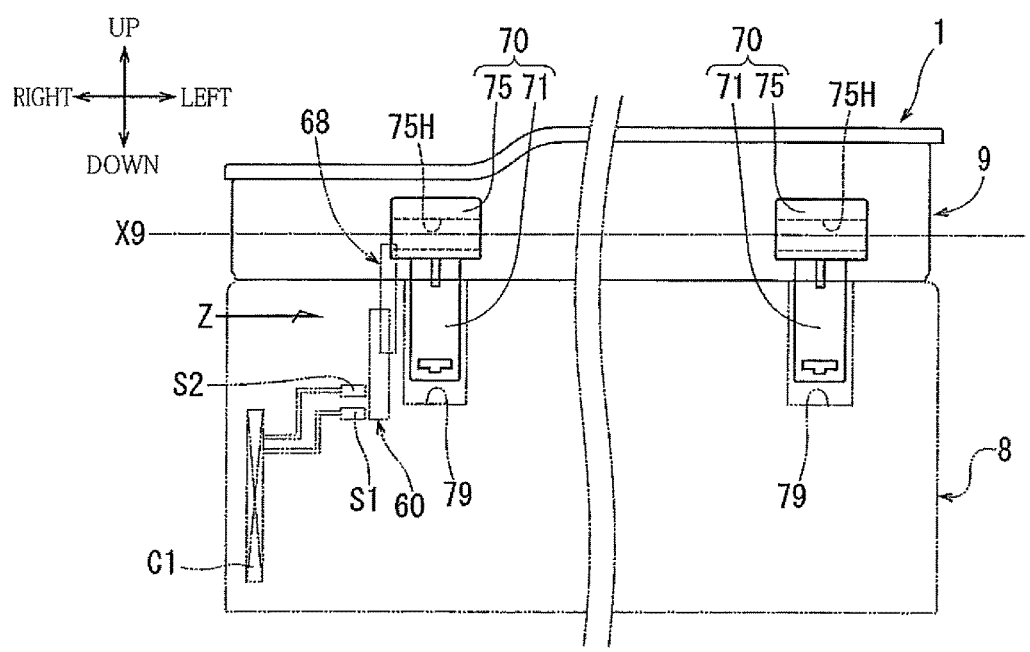
FIG. 3 is a schematic rear view of the image reading apparatus.

As illustrated in FIG. 2, the image forming unit 5 is provided in a lower portion of the main body 8. The image forming unit 5 performs ink-jet or laser recording to form an image on a sheet. The cover 9 is provided with the conveyor 4. The conveyor 4 conveys a plurality of sheets one by one along a conveyance path P1 illustrated in FIGS. 2 and 5. The reading unit 3 is provided in an upper portion of the main body 8. The reading unit 3 reads an image formed on a sheet conveyed by the conveyor 4.

Figure 4:
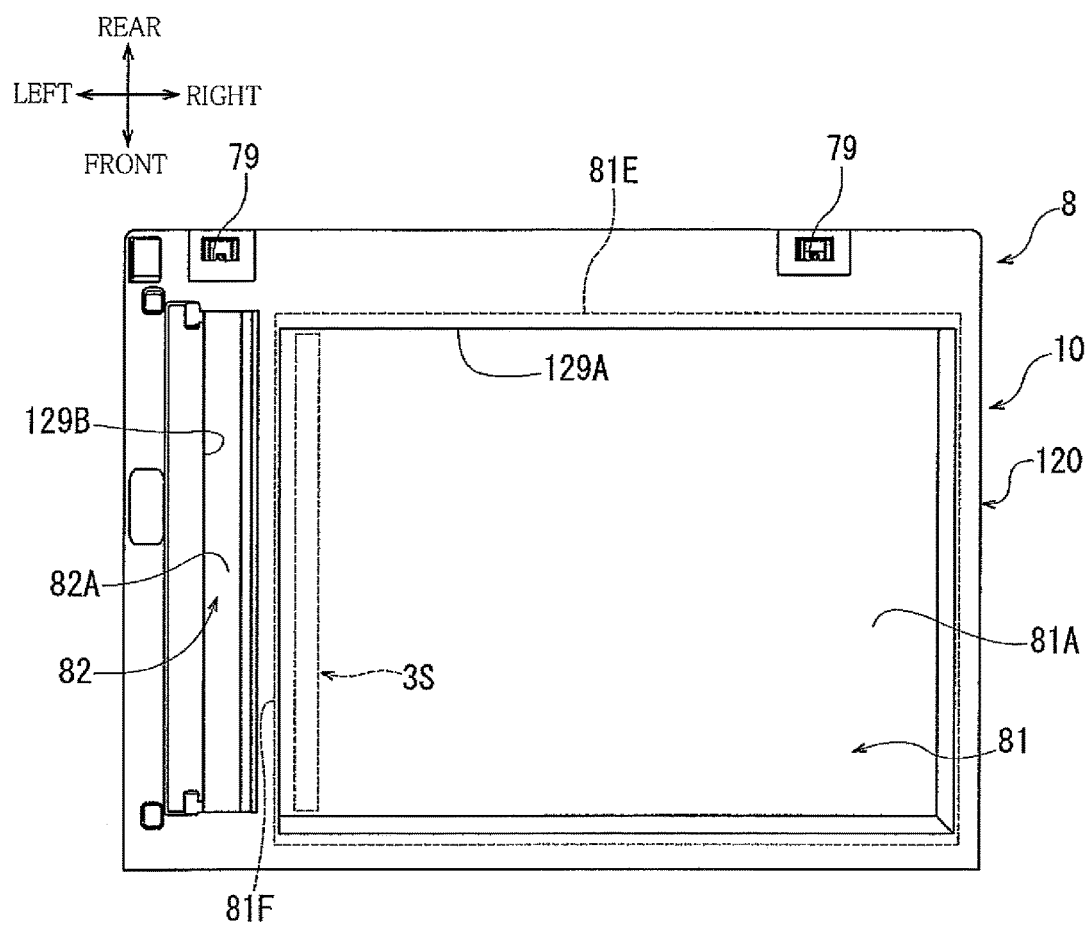
FIG. 4 is a top view illustrating a housing and first and second supporters of the image reading apparatus.
Figure 5:
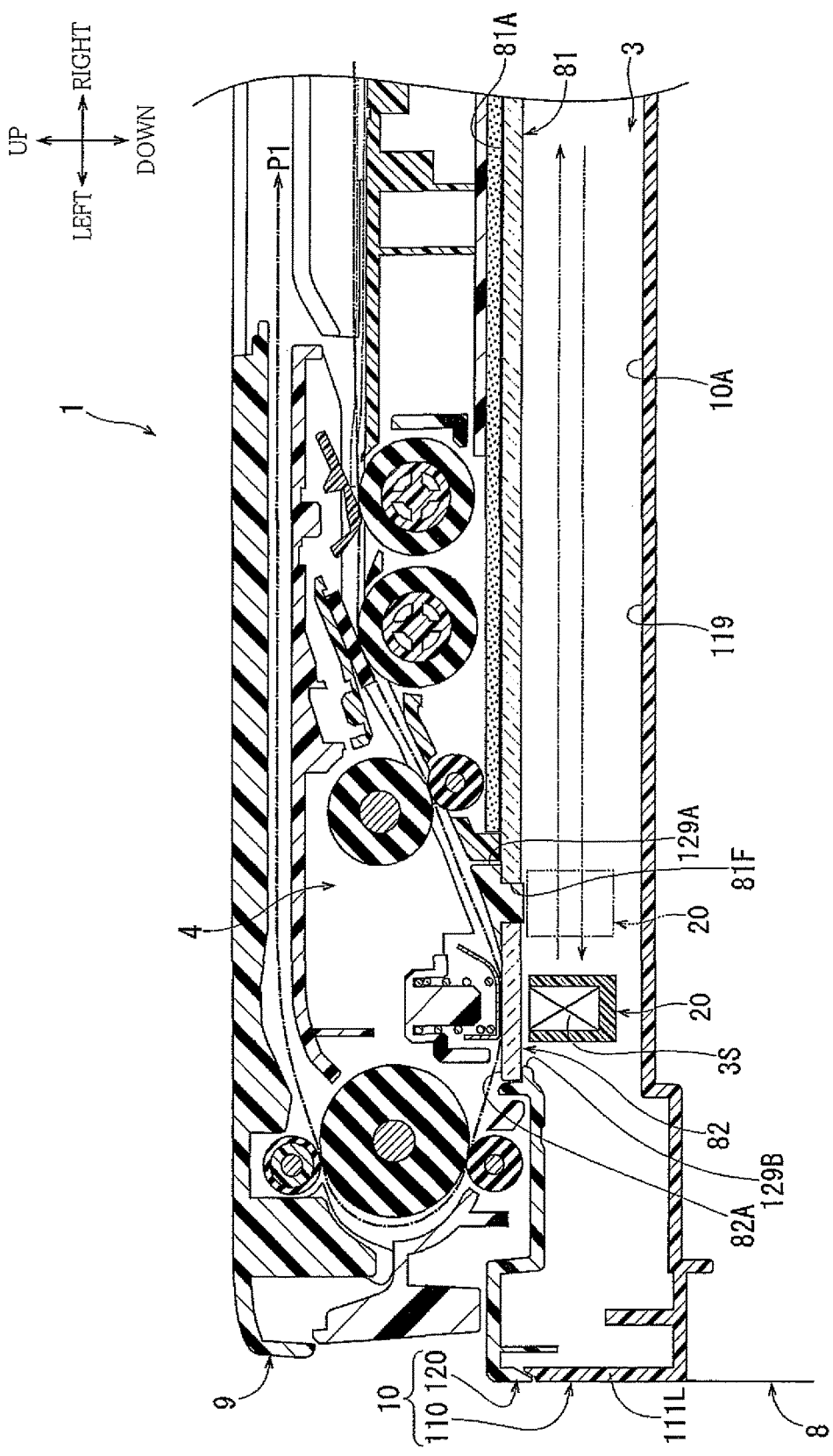
FIG. 5 is a partial cross-sectional view of the image reading apparatus.
Figure 6:
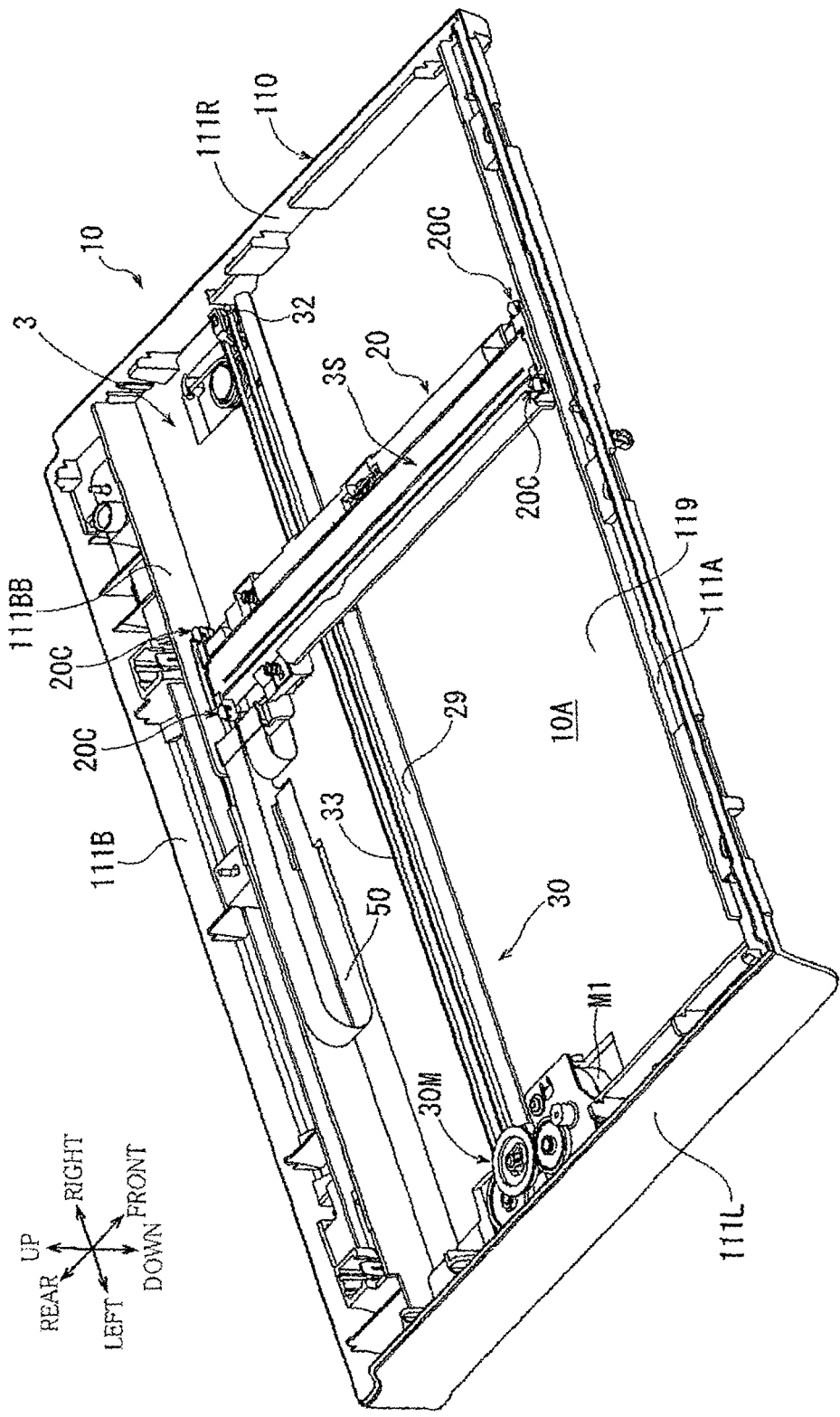
FIG. 6 is a perspective view illustrating components including a bottom surface of the housing, a mover, and an image reader of the image reading apparatus.

As illustrated in FIGS. 4-6, the reading unit 3 includes a scanner housing 10, a first platen glass 81, a second platen glass 82, a carriage 20, a reading sensor 3S, and a scanning mechanism 30. The scanner housing 10 is one example of a housing. The first platen glass 81 is one example of a first supporter. The second platen glass 82 is one example of a second supporter. The carriage 20 is one example of a mover. The reading sensor 3S is one example of an image reader.

The scanner housing 10 includes a scanner base 110 illustrated in FIG. 6 and a scanner top 120 illustrated in FIG. 4 which are assembled to each other in the up and down direction as illustrated in FIG. 5. The scanner base 110 is one example of a first housing, and the scanner top 120 is one example of a second housing. The scanner housing 10 has an accommodating area 10A formed therein. In the present embodiment, the scanner base 110 and the scanner top 120 are formed by injection molding of thermoplastic resin. As illustrated in FIG. 1, a front surface of the scanner housing 10 is covered with the operation panel 8P and a front exterior cover 8C.

As illustrated in FIG. 6, the scanner base 110 has a bottom surface 119, a left wall 111L, a right wall 111R, a front wall 111A, a first rear wall 111B, and a second rear wall 111BB. The bottom surface 119 is a substantially rectangular flat surface extending substantially in a horizontal direction. The left wall 111L and the right wall 111R stand respectively on left and right end portions of the bottom surface 119. The front wall 111A and the first rear wall 111B stand respectively on front and rear end portions of the bottom surface 119. The second rear wall 111BB stands on the bottom surface 119 in front of the first rear wall 111B and extends in the right and left direction so as to be parallel with the first rear wall 111B.

As illustrated in FIGS. 4 and 5, the scanner top 120 is shaped like a frame having a first opening 129A and a second opening 129B. The first opening 129A has a relatively large rectangular shape. The second opening 129B is located at the left of the first opening 129A and has a rectangular shape elongated in the front and rear direction. The first platen glass 81 is fitted in the first opening 129A, and the second platen glass 82 is fitted in the second opening 129B.

The entire outer edge 81E (see FIG. 4) of the first platen glass 81 is bonded to the scanner top 120 with a double-sided tape, not illustrated. The first platen glass 81 is nipped between the scanner top 120 and the scanner base 110 assembled to each other. Specifically, a front edge of the outer edge 81E of the first platen glass 81 is nipped between the front wall 111A of the scanner base 110 and a front end portion of the scanner top 120. A rear edge of the outer edge 81E of the first platen glass 81 is nipped between the second rear wall 111BB of the scanner base 110 and a rear portion of the scanner top 120. A right edge of the outer edge 81E of the first platen glass 81 is nipped between the right wall 111R of the scanner base 110 and a right end portion of the scanner top 120. It is noted that a left edge 81F (see FIGS. 4 and 5) of the outer edge 81E of the first platen glass 81 is bonded to the scanner top 120 with the double-sided tape, not illustrated, but not nipped between the scanner top 120 and the scanner base 110.

With these constructions, as illustrated in FIG. 5, the first platen glass 81 is supported by the scanner housing 10 so as to be spaced apart from the bottom surface 119 of the scanner base 110. The second platen glass 82 is supported by the scanner housing 10 so as to be spaced apart from the first platen glass 81 in the right and left direction.

As illustrated in FIGS. 4 and 5, an upper surface of the first platen glass 81 serves as a support surface 81A. In other words, the support surface 81A is one of opposite surfaces of the first platen glass 81, which one surface faces in a direction that is opposite to a direction directed toward the bottom surface 119 of the scanner base 110. When the reading unit 3 reads an image formed on a stationary document, the support surface 81A supports a lower surface of the document. Examples of the document include sheets, such as paper sheets and OHP sheets, and books.

An upper surface of the second platen glass 82 serves as a reading surface 82A. In other words, the reading surface 82A is one of opposite surfaces of the second platen glass 82, which one surface faces in the direction that is opposite to the direction directed toward the bottom surface 119 of the scanner base 110. When the reading unit 3 reads the sheets conveyed one by one by the conveyor 4, the reading surface 82A supports and guides lower surfaces the respective sheets.

In the present embodiment, an object for which image reading is performed using the support surface 81A is referred to as "document", and an object for which image reading is performed using the conveyor 4 is referred to as "sheet". The document and the sheet may be substantially the same as each other.

Figure 7A:
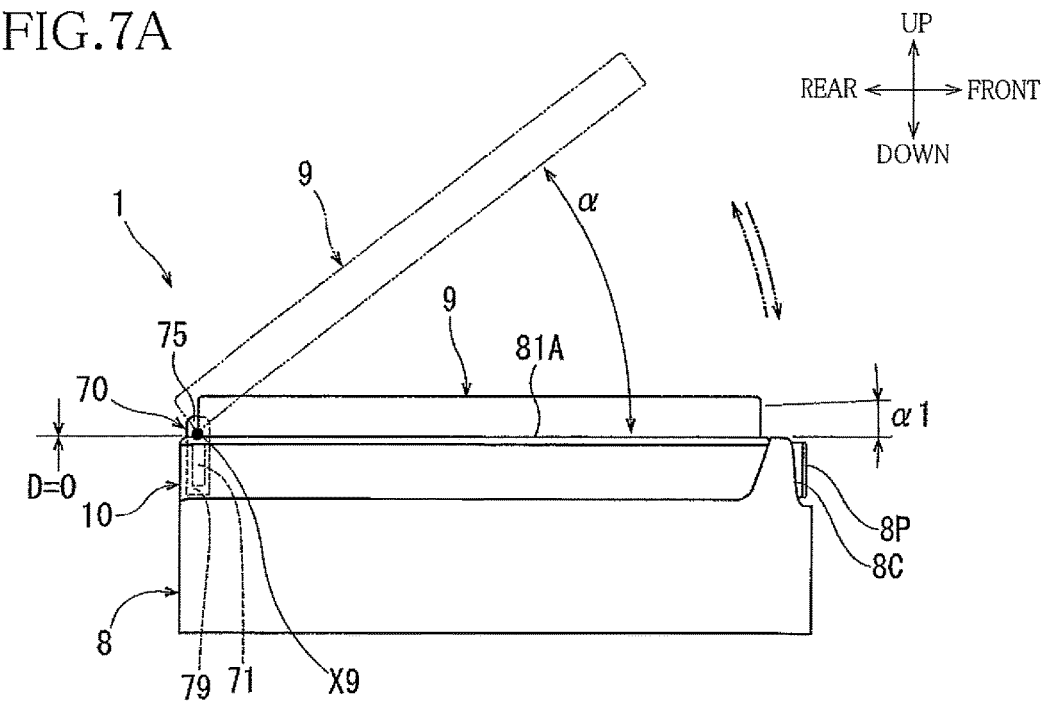
FIG. 7A is a side view illustrating a cover performing pivotal movement in a state in which the cover is not elevated.
Figure 7B:
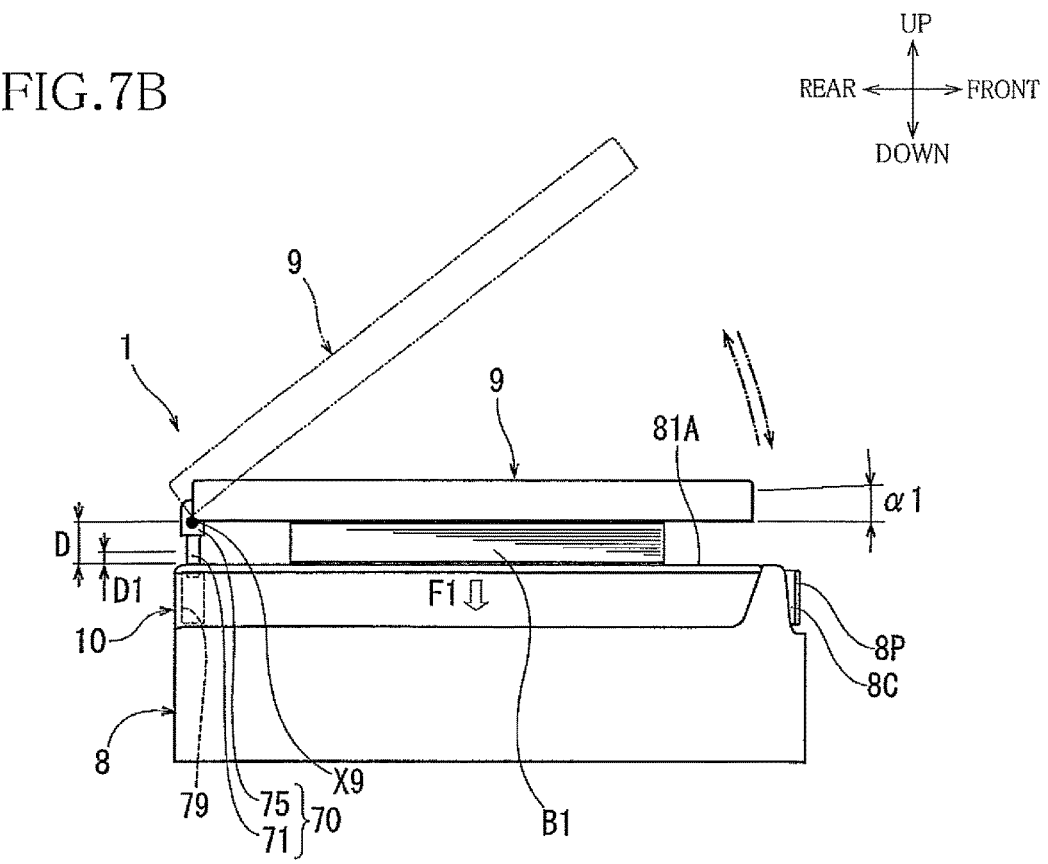
FIG. 7B is a side view illustrating the cover performing pivotal movement in a state in which the cover is elevated.

As illustrated in FIGS. 3, 7A, and 7B, a pair of right and left hinges 70 are provided between the scanner housing 10 and the cover 9. The cover 9 is supported by the hinges 70 so as to be pivotable about a pivot axis X9 extending in the tight and left direction that is substantially parallel with the support surface 81A.

Specifically, as illustrated in FIGS. 3 and 4, a rear end portion of the scanner top 120 of the scanner housing 10 has a pair of right and left accommodating portions 79. The accommodating portions 79 are located at the rear of the support surface 81A and recessed downward.

As illustrated in FIG. 3, each of the hinges 70 is formed of resin and has a mount portion 75 and a base portion 71 formed integrally with each other. The mount portion 75 is shaped like a block having a shaft receiving hole 75H formed therethrough. A shaft provided on the cover 9, not illustrated, is inserted into the shaft receiving holes 75H, whereby the mount portions 75 are mounted on the cover 9. In this state, the shaft serves as the pivot axis X9.

The base portion 71 is shaped substantially like a prism connected to a lower surface of the mount portion 75 and extending downward. The base portion 71 supports the mount portion 75 from below. The base portion 71 is inserted in a corresponding one of the accommodating portions 79 and thereby held by the scanner housing 10 so as to be reciprocable in the up and down direction substantially perpendicular to the support surface 81A. The up and down direction in which the base portion 71 is reciprocated is one example of a second direction.

As illustrated in FIGS. 7A and 7B, when the base portions 71 of the respective hinges 70 are moved upward and downward in the respective, accommodating portions 79, the mount portions 75 of the respective hinges 70 are also moved upward and downward together with the pivot axis X9. With this construction, the base portion 71 moves the cover 9 toward and away from the scanner housing 10 in the up and down direction.

As indicated by the solid lines in FIG. 7A, the cover 9 covers the support surface 81A from above, with a pivoting angle $\alpha$ being zero. The pivoting angle $\alpha$ is an angle of inclination of the cover 9 with respect to the support surface 81A. In this state, a lower surface of the cover 9 is held in contact with an upper surface of the scanner top 120. When pivotal movement of the cover 9 about the pivot axis X9 is caused from the state indicated by the solid line in FIG. 7A such that a front end portion of the cover 9 is moved upward and rearward, the pivoting angle $\alpha$ is increased, so that a state of the cover 9 is changed to a state indicated by the two-dot chain lines in FIG. 7A, for example.

The cover 9 is constructed such that the pivoting angle $\alpha$ may be zero as indicated by the solid lines in FIG. 7B in a state in which the base portions 71 of the respective hinges 70 are elevated in the respective accommodating portions 79 by a distance D. As indicated by two-dot chain lines in FIG. 7B, the pivoting angle $\alpha$ may be increased in this state.

When the pivoting angle $\alpha$ of the cover 9 is increased as indicated by the two-dot chain lines in FIGS. 7A and 7B, the cover 9 is moved upward from the support surface 81A so as to expose the support surface 81A. This movement allows a user to place the document onto the support surface 81A. When the pivoting angle $\alpha$ of the cover 9 is reduced in the state in which the document is placed on the support surface 81A, the cover 9 covers the document from above.

In the case where the document is a thin sheet, not illustrated, for example, the cover 9 covers an upper surface of the thin sheet in the state in which the pivoting angle $\alpha$ is equal to or near zero as indicated by the solid lines in FIG. 7A and in a state in which the base portions 71 of the respective hinges 70 are located at lower portions of the respective accommodating portions 79 with the pivot axis X9, in other words, in the state in which the distance D is equal to or near zero.

In the case where the document is a thick book B1 illustrated in FIG. 7B, for example, the cover 9 covers the thick book B1 from above in the state in which the pivoting angle $\alpha$ is equal to or near zero as indicated by the solid lines in FIG. 7B and in a state in which the base portions 71 of the respective hinges 70 are located at upper portions of the respective accommodating portions 79 with the pivot axis X9, in other words, the distance D is increased.

In the present embodiment, the state of the openable and elevatable cover 9 is classified into a closed state and a spaced state which are defined as follows.

As illustrated in FIGS. 7A and 7B, the spaced state is defined as a state which satisfies at least one of (i) a state in which the pivoting angle $\alpha$ of the cover 9 is greater than or equal to a set angle (particular angle) $\alpha 1$ and (ii) a state in which the distance D by which the base portion 71 is spaced apart from the scanner housing 10 in the up and down direction is greater than or equal to a set distance (particular distance) D1.

In the present embodiment, the closed state is any of states of the cover 9 other than the spaced state. That is, the closed state is a state in which the pivoting angle $\alpha$ of the cover 9 is greater than or equal to zero and less than the set angle $\alpha 1$, and the distance D by which the base portion 71 is spaced apart from the scanner housing 10 in the up and down direction is greater than or equal to zero and less than the set distance D1. That is, the set angle $\alpha 1$ and the set distance D1 are set such that the closed state includes a state in which the cover 9 is slightly inclined with respect to or slightly spaced apart from the support surface 81A. Each of the set angle $\alpha 1$ and the set distance D1 is determined appropriately.

For example, the cover 9 indicated by the solid lines in FIG. 7A is in the closed state because each of the pivoting angle $\alpha$ and the distance D is zero. The cover 9 indicated by the two-dot chain lines in FIG. 7A is in the spaced state because the pivoting angle $\alpha$ is greater than or equal to the set angle $\alpha 1$ though the distance D is zero. The cover 9 indicated by the solid lines in FIG. 7B is in the spaced state because the distance D is greater than or equal to the set distance D1 though the pivoting angle $\alpha$ is zero. The cover 9 indicated by the two-dot chain lines in FIG. 7B is in the spaced state because the pivoting angle $\alpha$ is greater than or equal to the set angle $\alpha 1$, and the distance D is greater than or equal to the set distance D1.

While the state of the cover 9 is classified into the closed state and the spaced state in the present embodiment, the present disclosure is not limited to this configuration.

As illustrated in FIGS. 1 and 2, a supply tray 9A is provided at an upper portion of the cover 9 so as to be openable. When a state of the supply tray 9A is switched from a state in which the supply tray 9A is stored as illustrated in FIG. 1, to a state in which the supply tray 9A is opened as illustrated in FIG. 2, the sheet is placeable on the supply tray 9A. As illustrated in FIG. 5, the conveyor 4 has a well-known construction including conveying rollers and separating rollers. The conveyor 4 separates the sheets, supported on the opened supply tray 9A, from each other and conveys the sheets one by one along the conveyance path P1.

As illustrated in FIG. 6, the accommodating area 10A stores the carriage 20, the reading sensor 3S, and the scanning mechanism 30. A guide shaft 29 is provided on the bottom surface 119 of the scanner base 110. The guide shaft 29 is located at a substantially center of the bottom surface 119 in the front and rear direction and extends in the right and left direction from the left wall 111L to the right wall 111R of the scanner base 110.

The carriage 20 is formed of resin and elongated in the front and rear direction. The carriage 20 extends in the front and rear direction between the front wall 111A and the second rear wall 111BB of the scanner base 110. The carriage 20 is held in contact with an upper surface of the guide shaft 29 and guided by the guide shaft 29 in the right and left direction. Rollers 20C are provided on front and rear end portions of the carriage 20. The rollers 20C are rotated so as to be held in contact with lower surfaces of the first platen glass 81 and the second platen glass 82.

The scanning mechanism 30 includes a driving device 30M, a driven pulley 32, and a timing belt 33.

The driving device 30M includes: an electric motor M1; a group of gears, one of which is meshed with the electric motor M1; and a drive pulley, not illustrated. The drive pulley, not illustrated, is formed integrally with one of the gears of the driving device 30M, which one is the farthest from the electric motor M1 among the gears. In the present embodiment, the electric motor M1 is a stepping motor. The driving device 30M is located adjacent to the left wall 111L and near a left end of the guide shaft 29. When the driving device 30M is driven by the controller C1 illustrated in FIGS. 3 and 9, the electric motor M1 is rotated forwardly or reversely, which rotates the drive pulley, not illustrated, forwardly or reversely. The controller C1 controls the driving device 30M based on a driving condition (as one example of a driving manner) to cause the driving device 30M to generate a driving force. This configuration will be described later in detail.

As illustrated in FIG. 6, the driven pulley 32 is located adjacent to the right wall 111R of the scanner base 110 and at the rear of the right end of the guide shaft 29. The timing belt 33 is an endless belt looped over the driven pulley 32 and the drive pulley, not illustrated, of the driving device 30M. Though not illustrated, the timing belt 33 is coupled to the carriage 20 at its portion extending in the right and left direction along the guide shaft 29.

When the driving device 30M is driven, the timing belt 33 is rotated between the drive pulley, not illustrated, and the driven pulley 32. During this rotation, the electric motor M1 may be rotated forwardly and reversely to reciprocate the carriage 20 in the right and left direction in the accommodating area 10A.

As illustrated in FIGS. 5 and 6, the reading sensor 3S is supported by the carriage 20 so as to face the lower surfaces of the first platen glass 81 and the second platen glass 82 in the accommodating area 10A. The reading sensor 38 is a well-known, image reading sensor such as a contact image sensor (CIS) and a charge coupled device (CCD). The reading sensor 3S extends in the front and rear direction. The length of the reading sensor 3S in the front and rear direction is greater than that of the document placed on the support surface 81A. The reading sensor 3S is electrically connected to the controller C1 illustrated in FIGS. 3 and 9 by a flat cable 50 which is capable of following reciprocation of the carriage 20.

As illustrated in FIG. 5, when receiving the driving force from the driving device 30M of the scanning mechanism 30, the carriage 20 is reciprocated in the right and left direction between the first platen glass 81 and the bottom surface 119 of the seamier base 110. The reading sensor 3S supported by the carriage 20 is also reciprocated in the right and left direction with the carriage 20. The right and left direction in which the carriage 20 and the reading sensor 3S are reciprocated is one example of a first direction. A position of the carriage 20 and the reading sensor 38 indicated by the solid lines in FIG. 5 is a stationary reading position at which the carriage 20 and the reading sensor 38 are opposed to the second platen glass 82 from below. The stationary reading position is one example of a reading position opposed to the second supporter. A position of the carriage 20 and the reading sensor 3S indicated by the two-dot chain lines in FIG. 5 is a movement start position at which the carriage 20 and the reading sensor 3S are at rest between the support surface 81A and the reading surface 82A and starts moving in a reading operation of the reading unit 3. When the carriage 20 and the reading sensor 3S are located at this position, the reading sensor 3S obtains information such as reference values required for the reading operation.

Image Reading Operation

As used herein, "FB reading operation" refers to a reading operation in which the reading sensor 38 reads an image formed on the document placed on the support surface 81A during movement of the carriage 20. In the case where the FB reading operation is performed, the controller C1 controls the scanning mechanism 30 and the reading sensor 3S to cause the driving device 30M to move the reading sensor 3S mounted on the carriage 20 from the movement start position indicated by the two-dot chain lines in FIG. 5, toward a right end of the reading unit 3. As a result, the reading sensor 3S reads the image formed on the document placed on the support surface 81A. Image data created by reading of the reading sensor 3S is transmitted to the controller C1 via the flat cable 50. After completion of the reading, the scanning mechanism 30 moves the reading sensor 3S leftward in the reading unit 3 to the movement start position indicated by the two-dot chain lines in FIG. 5.

In the case where the reading sensor 3S reads images formed on the respective sheets conveyed one by one from the opened supply tray 9A by the conveyor 4, the controller C1 controls the scanning mechanism 30 and the reading sensor 3S to cause the driving device 30M to move the reading sensor 3S mounted on the carriage 20 toward a left end of the reading unit 3 and stop the reading sensor 3S at the stationary reading position indicated by the solid lines in FIG. 5. When the sheets are conveyed one by one from the supply tray 9A by the conveyor 4 along the conveyance path P1, each sheet passes over the reacting sensor 3S located at the stationary reading position indicated by the solid lines in FIG. 5. The reading sensor 3S reads an image formed on the passing sheet. Image data created by reading of the reading sensor 3S is transmitted to the controller C1 via the flat cable 50. After completion of the reading, the scanning mechanism 30 moves the reading sensor 3S from the stationary reading position indicated by the solid lines in. FIG. 5 back to the movement start position indicated by the two-dot chain lines in FIG. 5.

Obtaining Processing, Determination Processing, and Driving Control Processing

In the image reading apparatus 1 according to the first embodiment, a load acts on the support surface 81A of the first platen glass 81 in some cases. Specifically, as illustrated in FIG. 7B, in the ease where the thick book 91 is supported on the first platen glass 81, a load F1 may act downward on the support surface 81A due to a user operation of pressing a book 91 onto the support surface 81A, the weight of the book B1, and/or the weight of the cover 9 covering the book 91, for example. Also, though not illustrated, in the case where a curled document is supported on the first platen glass 81, a load similar to the load F1 may act on the support surface 81A by a user operation of pressing the document onto the support surface 81A to remove the curl of the document. If no measures are taken against such a load, the first platen glass 81 may be bent downward by an excessive amount. This bending may cause the lower surface of the first platen glass 81 to be brought into contact with the rollers 20C and accordingly with the carriage 20 disposed on the upper surface of the guide shaft 29 held by the scanner base 110, leading to a large resistance acting on the carriage 20 from the first platen glass 81. Thus, the carriage 20 may be changed in speed or stopped during the FB reading operation, leading to malfunctions such as misreading of image by the reading sensor 3S and interruption of the FB reading operation.

To prevent these malfunctions, the controller C1 of this image reading apparatus 1 executes an obtaining processing, a determination processing, and a driving control processing in the FB reading operation as follows.

As illustrated in FIG. 9, the controller C1 is a control circuit including a CPU. The controller C1 controls the conveyor 4, the driving device 30M of the scanning mechanism 30, the reading sensor 3S, and the operation panel 81 based on various kinds of information stored in information storage devices such as a ROM and a RAM.

As illustrated in FIGS. 3, 8A-8D, and 9, a pivotal movement sensor S1 and a vertical movement sensor S2 are electrically connected to the controller C1. The pivotal movement sensor S1 and the vertical movement sensor S2 are used to detect a position (attitude) of an actuator 60 illustrated in FIGS. 3 and 8A-8D. Examples of the pivotal movement sensor S1 and the vertical, movement sensor S2 include a photo interrupter, a microswitch, and a proximity switch.

As illustrated in FIG. 3, the actuator 60 is provided in the main body 8 at a position adjacent to the base portion 71 of the left hinge 70. As illustrated in FIGS. 8A-8D, the actuator 60 includes a shaft 61, an upper protrusion 62, a lower protrusion 63, and two columnar portions. The shaft 61 is engaged with a guide rail 69 fixed in the main body 8 such that the shaft 61 is pivotable and movable in the up and down direction. That is, the actuator 60 is held by the guide rail 69 so as to be pivotable and movable in the up and down direction. The upper protrusion 62 protrudes frontward from a middle portion of one of the columnar portions which extends upward from the shaft 61. The lower protrusion 63 protrudes downward from a distal end of the other columnar portion extending frontward from the shaft 61.

A link rod 68 is engaged with the upper protrusion 62. As illustrated in FIG. 3, an upper end portion of the link rod 68 is located adjacent to the mount portion 75 of the left hinge 70 and coupled to the cover 9 by a linkage mechanism, not illustrated.

Figure 8A:
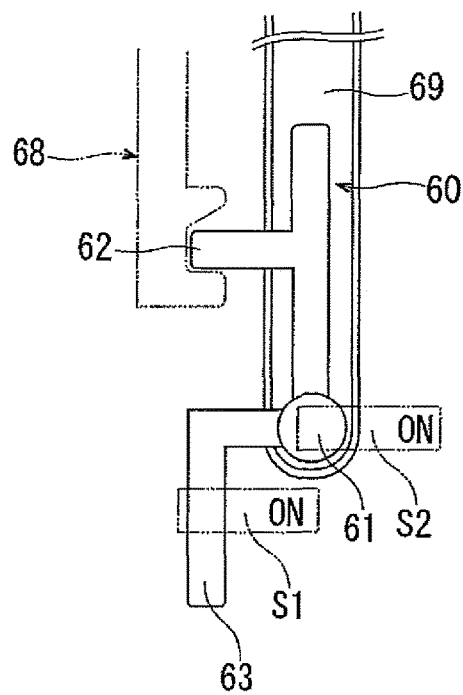
FIGS. 8A through 8D are partial schematic views each illustrating a portion viewed in a Z direction in FIG. 3 and for explaining a relationship between a position of an actuator which pivots with pivotal movement of the cover and an ON/OFF state of each of a pivotal movement sensor and a vertical movement sensor.
Figure 8B:
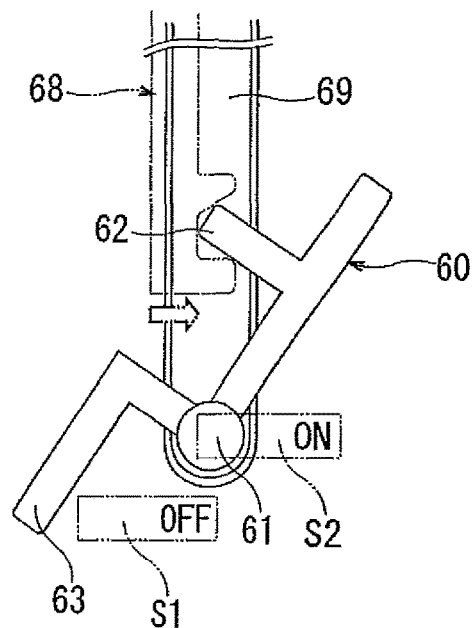
Figure 8C:
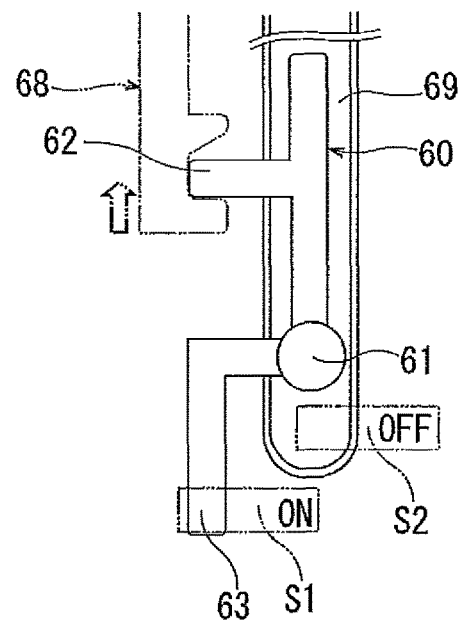
Figure 8D:
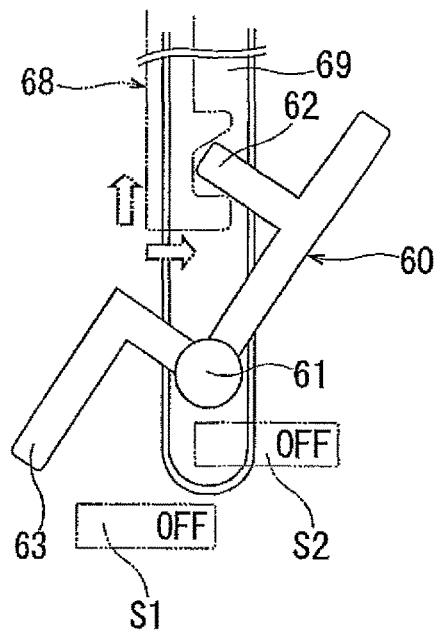

When pivotal movement of the cover 9 is caused about the pivot axis X9, the link rod 68 is moved from a position illustrated in FIG. 8A in the rear direction as illustrated in FIG. 8B or 8D. The moved link rod 68 pushes the upper protrusion 62 rearward, causing the actuator 60 to pivot from the position illustrated in FIG. 8A in a clockwise direction in FIGS. 8A-8D as illustrated in FIG. 8B or 8D.

When the base portions 71 of the respective hinges 70 are elevated in the respective accommodating portions 79, the link rod 68 is also elevated from the position illustrated in FIG. 8A, as illustrated in FIG. 8C or 8D. The elevated link rod 68 pulls the upper protrusion 62 upward, thereby elevating the actuator 60 from the position illustrated in FIG. 8A, as illustrated in FIG. 8C or 8D.

The pivotal movement sensor S1 is disposed so as to be capable of detecting the lower protrusion 63 of the actuator 60. The vertical movement sensor S2 is disposed so as to be capable of detecting the shaft 61 of the actuator 60.

The actuator 60 is located at an angle illustrated in FIGS. 8A and 8C when the pivoting angle $\alpha$ of the cover 9 is less than the set angle $\alpha 1$. In this case, the pivotal movement sensor S1 detects the lower protrusion 63 and establishes an ON state.

The actuator 60 is located at an angle illustrated in FIGS. 8B and 8D when the pivoting angle $\alpha$ of the cover 9 is greater than or equal to the set angle $\alpha 1$. In this case, the pivotal movement sensor S1 does not detect the lower protrusion 63 and establishes an OFF state.

The actuator 60 (specifically, the shaft 61) is located at a height position illustrated in FIGS. 8A and 8D when the distance D between the scanner housing 10 and the base portion 71 of the hinge 70 in the up and down direction is less than the set distance D1. In this case, the vertical movement sensor S2 detects the shaft 61 and establishes an ON state.

The actuator 60 (specifically, the shaft 61) is located at a height position illustrated in FIGS. 8C and 8D when the distance D is greater than or equal to the set distance D1. In this case, the vertical movement sensor S2 does not detect the shaft 61 and establishes an OFF state.

That is, when the cover 9 is in the closed state, each of the pivotal movement sensor S1 and the vertical movement sensor S2 is in the ON state. When the cover 9 is in the spaced state, at least one of the pivotal movement sensor S1 and the vertical movement sensor S2 is in the OFF state.

The ON/OFF state of each of the pivotal movement sensor S1 and the vertical movement sensor S2 is one example of first information. The ON/OFF state of each of the pivotal movement sensor S1 and the vertical movement sensor S2 is information that enables estimation of whether the first platen glass 81 may be under a load enough to bend the first platen glass 81 by an amount greater than a set amount (particular amount).

Specifically, when each of the pivotal movement sensor S1 and the vertical movement sensor S2 is in the ON state, it is possible to estimate that there is a high possibility that the cover 9 is in the closed state and that not the thick hook B1 illustrated in FIG. 7B but the thin sheet is supported on the support surface 81A of the first platen glass 81. Thus, it is possible to determine that this state is not the state in which the first platen glass 81 is under the load enough to bend the first platen glass 81 by an amount greater than the set amount.

When at least one of the pivotal movement sensor S1 and the vertical movement sensor S2 is in the OFF state, it is possible to estimate that there is a high possibility that the cover 9 is in the spaced state and that the thick book B1 illustrated in FIG. 7B is supported on the support surface 81A of the first platen glass 81. Thus, it is possible to determine that this state is the state in which the first platen glass 81 is under the load enough to bend the first platen glass 81 by an amount greater than the set amount. As described above, the respective states of the pivotal movement sensor S1 and the vertical movement sensor S2 change depending upon change in magnitude of the load (force) acting on the support surface 81A. Accordingly, by obtaining the states of the pivotal movement sensor S1 and the vertical movement sensor S2, the controller C1 may determine whether the state of the image reading apparatus 1 is the state in which a load enough to bend the first platen glass 81 acts on the support surface 81A or the state in which a load enough to bend the first platen glass 81 does not act on the support surface 81A.

Figure 10:
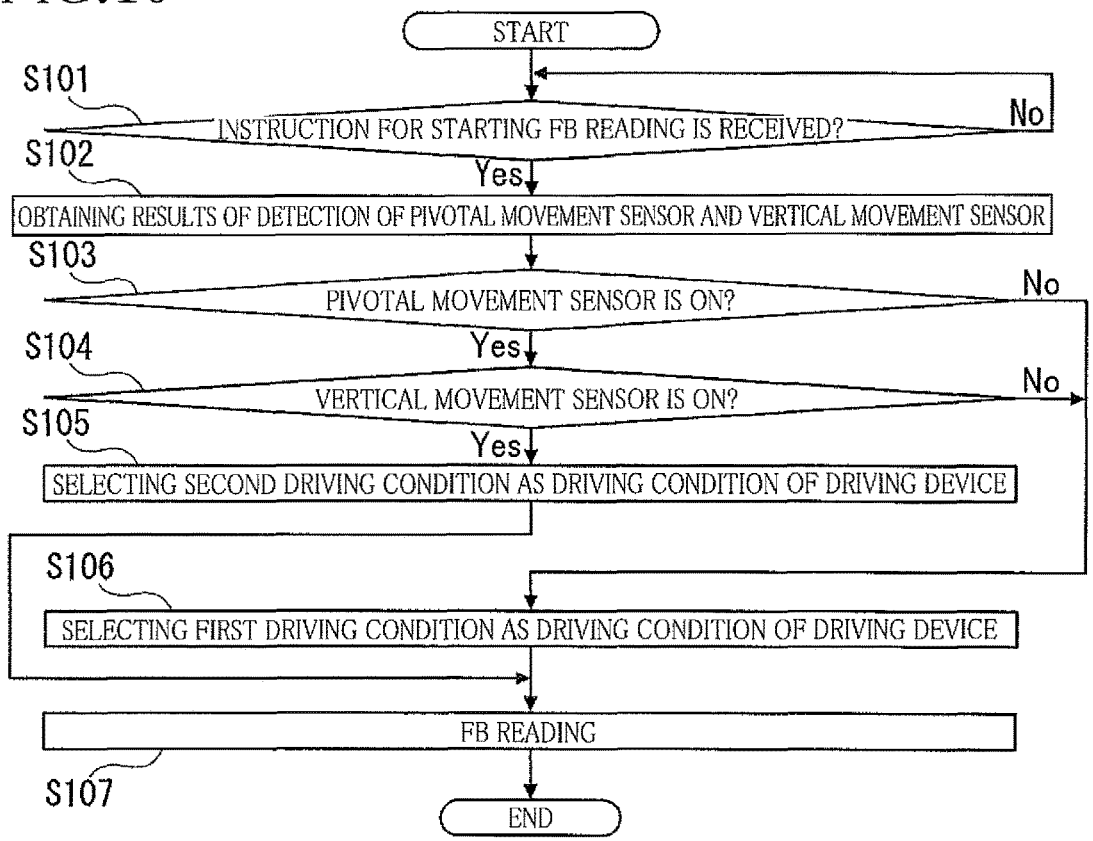
FIG. 10 is a flow chart illustrating processings for an image reading operation using a flat bed.

The controller C1 repeats execution of the FB reading operation program illustrated in FIG. 10 based on such load information during operation of the image reading apparatus 1.

The flow in FIG. 10 begins with S101 at which the controller C1 determines whether the controller C1 receives an instruction for starting the FB reading operation. When a positive decision (Yes) is made at S101, this flow goes to S102. When a negative decision (No) is made at S101, the controller C1 repeats the processing at S101.

The controller C1 at S102 obtains results of detection of the pivotal movement sensor S1 and the vertical movement sensor S2, and this flow goes to S103.

The controller C1 at S103 determines whether the pivotal movement sensor S1 is in the ON state. When a negative decision (No) is made at S103, this flow goes to S106. When a positive decision (Yes) is made at S103, this flow goes to S104.

The controller C1 at S104 determines whether the vertical movement sensor 82 is in the ON state. When a negative decision (No) is made at S104, this flow goes to S106. When a positive decision (Yes) is made at 8104, this flow goes to S105.

The controller C1 at S105 selects a second driving condition (as one example of a second driving manner) as a driving condition of the driving device 30M, and this flow aces to S107.

At S106, the controller C1 selects a first driving condition (as one example of a first driving manner) as the driving condition of the driving device 30M, and this flow goes to S107.

Figure 11A:
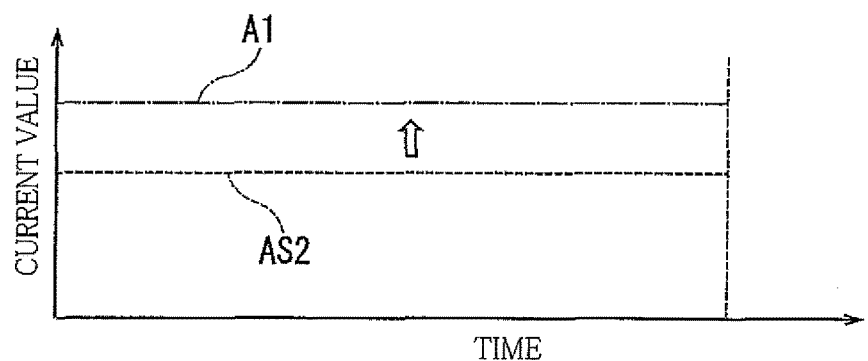
FIGS. 11A and 11B are graphs for explaining first and second driving conditions in the image reading apparatus according to the first embodiment.
Figure 11B:
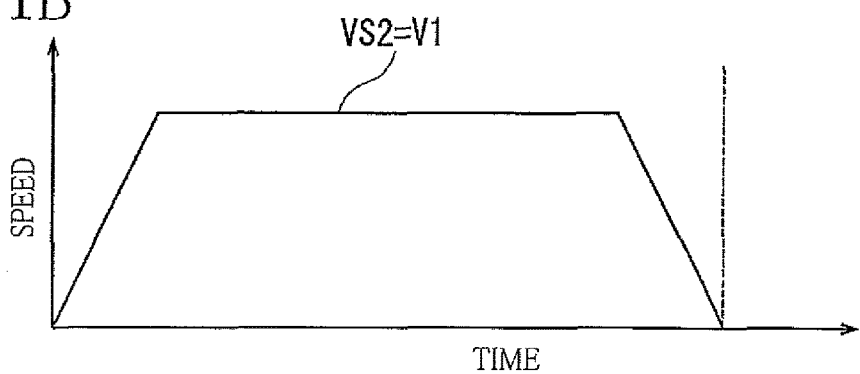

Here, FIGS. 11A and 11B illustrate a difference between the first driving condition and the second driving condition. As illustrated in FIG. 11A, a drive current of a value AS2 is applied to the driving device 30M on the second driving condition, and this value AS2 is determined as a reference current value. The reference current value AS2 is a fixed value. In the state in which no load acts on the support surface 81A, the controller C1 based on the second driving condition controls the driving device 30M to generate the driving force for moving the carriage 20 such that, as illustrated in FIG. 11B, a moving speed of the carriage 20 is increased from zero, then kept constant, and then decreased to zero. This moving speed of the carriage 20 is defined as a speed VS2 as a reference speed. In the present embodiment, the reference current value AS2 is small enough to reduce noises generated in the FB reading operation.

On the first driving condition, as illustrated in FIG. 11A, a value A1 of the drive current applied to the driving device 30M is a fixed value greater than the reference current value AS2. The controller C1 based on the first driving condition controls the driving device 30M to generate the driving force for moving the carriage 20 such that, as illustrated in FIG. 11B, a speed V1 (the change in the speed V1) of the carriage 20 coincides with the reference speed VS2 (the change in the speed VS2) on the second driving condition. Here, the drive current generated by the electric motor M1 as the stepping motor is set such that the value A1 on the first driving condition is greater than the reference current value AS2, whereby the driving force is greater on the first driving condition than on the second driving condition, making it difficult for the electric motor M1 to be affected from outside. That is, the first driving condition is a condition capable of reducing changes in the speed of the carriage 20 by bringing the speed V1 of the carriage 20 moving in the state in which the load acts on the support surface 81A, closer to the reference speed VS2, specifically, by keeping the speed V1 equal to the reference speed VS2. That is, an amount of change in the speed of the carriage 20 when the controller C1 controls the driving device 30M to generate the driving force based on the first driving condition in the state in which the load acts on the support surface 81A may be less than an amount of change in the speed of the carriage 20 when the controller C1 controls the driving device 30M to generated the driving force based on the second driving condition in the state in which the load acts on the support surface 81A, making it possible to reduce changes in the speed of the carriage 20.

At S107 in FIG. 10, the controller C1 controls the driving device 30M and the reading sensor 3S to perform the FB reading operation. In this operation, the driving device 30M generates the driving force based on a selected one of the first driving condition and the second driving condition. A load acting on the support surface 81A is greater in magnitude when the first driving condition is selected at S106, and the driving device 30M is driven based on the first driving condition than when the second driving condition is selected at S105, and the driving device 30M is driven based on the second driving condition. In this FB reading operation, as illustrated in FIG. 11B, the carriage 20 is accelerated and then moved at the constant reference speed VS2 (=V1). During this movement at the constant speed, the reading sensor 38 reads an image formed on the document placed on the support surface 81A. Upon completion of the processing at S107, this flow ends, and the controller C1 repeatedly executes the FB reading operation program illustrated in FIG. 10.

Effects

In the image reading apparatus 1 according to the first embodiment, as illustrated in FIG. 10, the controller C1 executes the processing at S102 as one example of the obtaining processing, the processings at S103 and S104 as one example of the determination processing, and the processings at S105-S107 as one example of the driving control processing.

The controller C1 at S102 obtains the results of detection of the pivotal movement sensor S1 and the vertical movement sensor 82, as the load information to be used for determination of a load acting on the support surface 81A of the first platen glass 81.

The controller C1 at S103 and S104 determines whether the load acts on the support surface 81A, based on the results of detection of the pivotal movement sensor S1 and the vertical movement sensor S2 which are obtained at S102.

When the cover 9 is in the spaced state, the controller C1 at S105-S107 determines that the load acts on the support surface 81A, based on the results of determination at S103 and S104. In this case, the controller C1 controls the driving device 30M to generate the driving force based on the first driving condition.

Here, as illustrated in FIGS. 11A and 11B, the image reading apparatus 1 sets the first driving condition, assuming that a large resistance acts on the carriage 20. Specifically, in the first driving condition, as illustrated in FIG. 11A, the value A1 of the drive current applied to the driving device 30M is a fixed value greater than the reference current value AS2. With this configuration, even in the case where the first platen glass 81 is bent due to the load, the electric motor M1 generates an increased driving force, making it difficult for the electric motor M1 to be affected from outside, resulting in reduction in changes in the speed of the carriage 20. This prevents malfunctions such as misreading of image by the reading sensor 3S and interruption of the FB reading operation.

When the cover 9 is in the closed state, the controller C1 at S105-S107 determines that no load acts on the support surface 81A based on the results of determination at S103 and S104. In this case, the controller C1 controls the driving device 30M to generate the driving force based on the second driving condition different from the first driving condition.

Here, the image reading apparatus 1 sets the second driving condition, assuming that a large resistance does not act on the carriage 20. Specifically, as illustrated in FIG. 11A, the reference current value AS2 in the second driving condition is smaller than the value A1 of the drive current in the first driving condition. This configuration reduces operating noises of the electric motor M1 driven at the reference current value AS2, resulting in reduced noises during the FB reading operation on the second driving condition.

Accordingly, the image reading apparatus 1 according to the first embodiment is capable of performing the FB reading operation well and stably even in the case where the load acts on the support surface 81A.

In this image reading apparatus 1, the first driving condition is set so as to reduce changes in the speed of the carriage 20 due to the load acting on the first platen glass 81 during the FB reading operation. Specifically, the first driving condition is set such that the speed V1 of movement of the carriage 20 in the state in which the load acts on the support surface 81A is brought closer to the reference speed VS2, specifically; such that the speed V1 is kept equal to the reference speed VS2. More specifically, as illustrated in FIG. 11A, the first driving condition is set such that the value A1 of the drive current applied to the driving device 30M is the fixed value greater than the reference current value AS2. With this configuration, even in the case where the first platen glass 81 is bent due to the load, it is possible to reliably reduce malfunctions such as misreading of image by the reading sensor 3S and interruption of the FB reading operation.

In this image reading apparatus 1, the load information contains the ON/OFF states of the pivotal movement sensor S1 and the vertical movement sensor S2 as information indicating whether the cover 9 is in the closed state or the spaced state. That is, the load information contains information which is related to a using state of the user and which is usable for estimation of whether the load acts on the support surface 81A. This configuration allows the controller C1 to well switch the driving condition between the first driving condition and the second driving condition. Here, when a start of the FB reading operation is instructed in the spaced state of the cover 9, for example, it is assumed that a thick document such as a book is to be read. In this case, the user may press the book onto the support surface 81A, leading to an estimation that a load larger than normal acts on the support surface 81A. In the present embodiment, the state of the cover 9 is used to estimate the state in which the load acts on the support surface 81A.

In this image reading apparatus 1, the base portions 71 of the respective hinges 70 are moved upward and downward in the respective accommodating portions 79, thereby moving the cover 9 toward and away from the support surface 81A in the up and down direction. The spaced state of the cover 9 includes at least one of (i) the state in which the cover 9 is inclined about the pivot axis X9 with respect to the support surface 81A about greater than or equal to the set angle $\alpha 1$ and (ii) the state in which the base portions 71 are spaced apart from the scanner housing 10 in the second direction by greater than or equal to the set distance D1. The spaced state of the cover 9 includes the plurality of states as described above, and the load information is specific information affected by the spaced state. This configuration allows the controller C1 to switch the driving condition between the first driving condition and the second driving condition in the driving control processing. Here, in the case where a thick document such as a book is placed on the support surface 81A even in the state in which the cover 9 is closed, for example, the base portions 71 of the respective hinges 70 are elevated, which allows the cover 9 to be closed regardless of the thickness of the book. However, there is a possibility that the user presses the cover 9 from above in this state. The pressing force acting on the cover 9 from above may be transmitted to the support surface 81A via the document. Also in this state, it is estimated that a load larger than normal acts on the support surface 81A. In the present embodiment, the elevated state of the hinges 70 is used to estimate the state in which the load acts on the support surface 81A.

In this image reading apparatus 1, when the reading sensor 3S reads the sheet conveyed by the conveyor 4, the controller C1 moves the carriage 20 to the stationary reading position indicated by the solid lines in FIG. 5 such that the reading sensor 3S is located just under the second platen glass 82 so as to be opposed to the second platen glass 82. In this case, the carriage 20 is reciprocated under the left edge 81F (near the second platen glass 82) of the outer edge 81E of the first platen glass 81. Thus, the left edge 81F of the first platen glass 81 is not nipped between the scanner base 110 and the scanner top 120. Accordingly, a portion of the scanner top 120 near the left edge 81F of the first platen glass 81 is easily bent due to a load. In the image reading apparatus 1, however, the controller C1 selects an appropriate one of the first driving condition and the second driving condition to reduce the changes in the speed of the carriage 20 even in such a case, resulting in stable image reading operations.

Second Embodiment

Figure 12A:
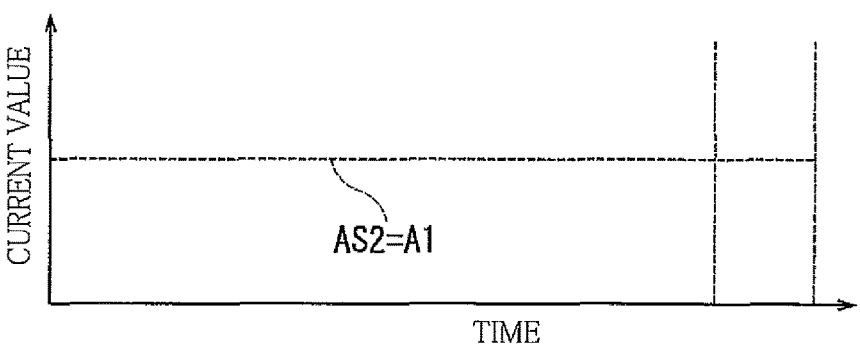
FIGS. 12A and 12B are graphs for explaining first and second driving conditions in an image reading apparatus according to a second embodiment.

In an image reading apparatus according to a second embodiment, the setting of the first driving condition in the image reading apparatus 1 according to the first embodiment is modified as follows: the first driving, condition in the second embodiment is set as illustrated in FIG. 12A such that the value A1 of the drive current applied to the driving device 30M is equal to the reference current value AS2.

Figure 12B:
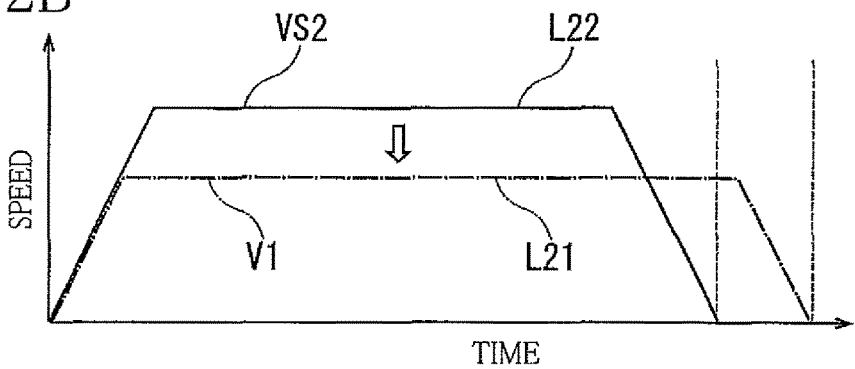

In FIG. 12B, the solid line L22 indicates changes in the speed of the carriage 20 based on the second driving condition, and a one-dot chain line L21 indicates changes in the speed of the carriage 20 based on the first driving condition. On the second driving condition, the electric motor M1 of the driving device 30M is rotated at a rotation speed RS2 when the carriage 20 is moved at the reference speed VS2. This rotation speed RS2 is defined as a reference rotation speed. The reference speed VS2 is obtained by multiplying the rotation speed RS2 by a reduction ratio of the driving device 30M. In this second embodiment, the first driving condition is set such that a rotation speed R1 of the electric motor M1 of the driving device 30M is less than the reference rotation speed RS2.

When the driving device 30M generates the driving force based on the first driving condition, the speed V1 is obtained by multiplying the rotation speed R1 by the reduction ratio of the driving device 30M, and this speed V1 is less than the reference speed VS2 (at the constant speed). That is, the speed of movement of the carriage 20 is small on the first driving condition than on the second driving condition, requiring a longer time for movement of the carriage 20 at the constant speed. However, the speed V1 is less than the reference speed VS2, making it difficult for the electric motor M1 of the driving device 30M to be affected from outside. This configuration reliably reduces changes in the speed of the carriage 20 due to the load acting on the first platen glass 81.

Accordingly, like the image reading apparatus 1 according to the first embodiment, the image reading apparatus according to the second embodiment is capable of stably and well performing the FB reading operation even in the case where the load acts on the support surface 81A.

Third Embodiment

Figure 13A:
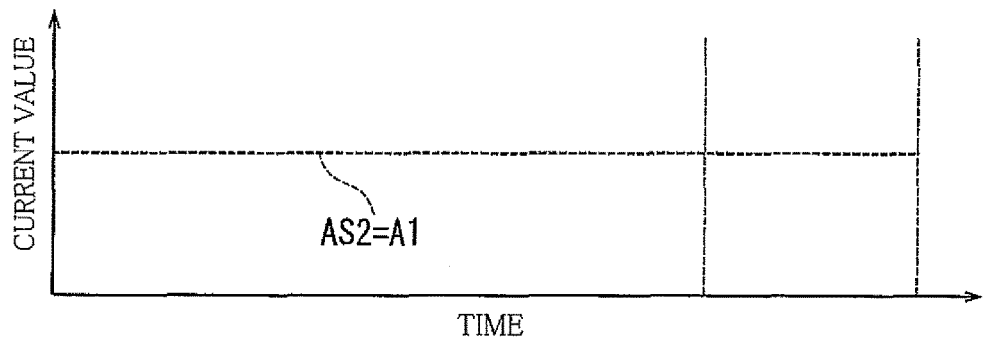
FIGS. 13A and 13B are graphs for explaining first and second driving conditions in an image reading apparatus according to a third embodiment.

In an image reading apparatus according to a third embodiment, the setting of the first driving condition in the image reading apparatus 1 according to the first embodiment is modified as follows: the first driving condition in the third embodiment is set as illustrated in FIG. 13A such that the value A1 of the drive current applied to the driving device 30M is equal to the reference current value AS2.

Figure 13B:
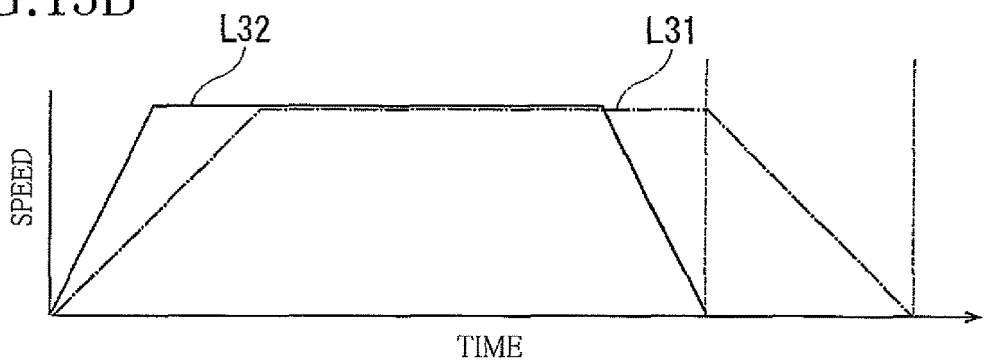

In FIG. 13B, the solid line L32 indicates changes in the speed of the carriage 20 based on the second driving condition in the state in which no load acts on the support surface 81A, and the one-dot chain line L31 indicates changes in the speed of the carriage 20 based on the first driving condition in the state in which the load acts on the support surface 81A. On the second driving condition, the carriage 20 is accelerated to the constant speed of the reference speed VS2 at an acceleration WS2 in the state in which no load acts on the support surface 81A. This acceleration WS2 is defined as a reference acceleration. In this third embodiment, the first driving condition is set such that an acceleration W1 at which the carriage 20 is accelerated to the constant speed of the reference speed VS2 is less than the reference acceleration WS2. In other words, the inclination of the one-dot chain line L31 at the acceleration of the carriage 20 on the second driving condition is gentler than the inclination of the solid line L32 at the acceleration of the carriage 20 on the first driving condition.

In this case, the movement start position of the carriage 20 needs to be located at the left of the position indicated by the two-dot chain lines in FIG. 5 to increase a distance of the acceleration. However, the acceleration W1 is less than the reference acceleration WS2, making it difficult for the electric motor M1 of the driving device 30M to be affected from outside. This configuration reliably reduces changes in the speed of the carriage 20 due to the load acting on the first platen glass 81.

Accordingly, like the image reading apparatus 1 according to the first and second embodiments, the image reading apparatus according to the third embodiment is capable of stably and well performing the FB reading operation even in the case where the load acts on the support surface 81A.

Fourth Embodiment

Figure 14A:
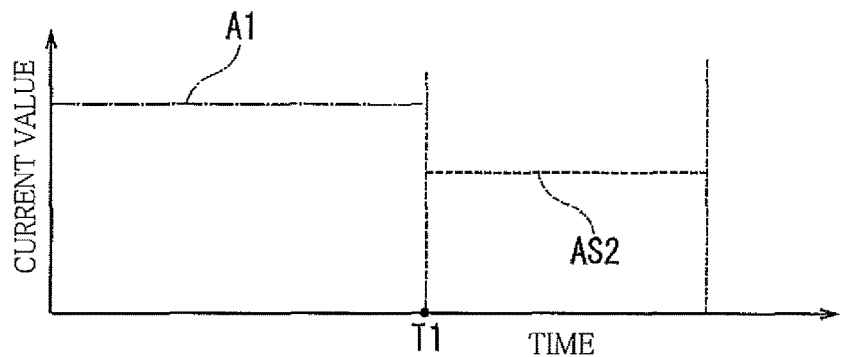
FIGS. 14A and 14B are graphs for explaining a switch from the first driving condition to the second driving condition in a middle of an image reading operation in an image reading apparatus according to a fourth embodiment.
Figure 14B:
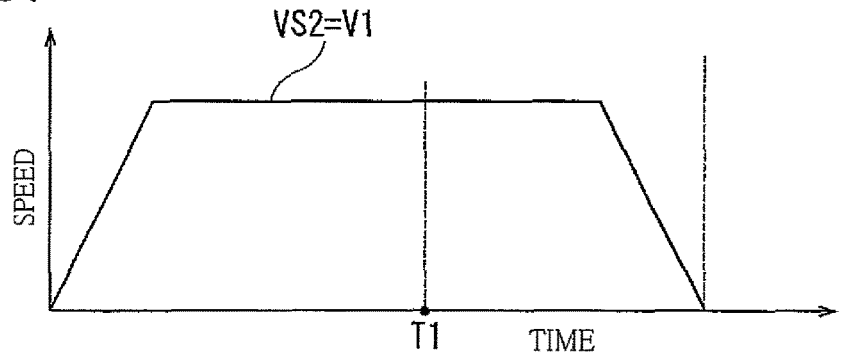

The image reading apparatus according to the fourth embodiment uses the same first and second driving conditions as used in the image reading apparatus 1 according to the first embodiment. As described above, when the controller C1 determines that the load acts on the support surface 81A, based on the results of determination at S103 and S104 in FIG. 10, the controller C1 at S106 selects the first driving condition and at S107 performs the FR reading operation. In the FB reading operation in this fourth embodiment, as illustrated in FIG. 14A, the controller C1 controls the driving device 30M to generate the driving force based on the first driving condition in the first embodiment, during movement of the carriage 20 in the first direction for a set distance from the movement start position opposed to one of edge portions of the first platen glass 81 which is nearer to the second platen glass 82. Specifically, as illustrated in 14A, the value A1 of the drive current applied to the driving device 30M during this movement is a fixed value greater than the reference current value AS2.

T1 in FIG. 14A denotes a point in time at which the movement of the carriage 20 for the set distance is finished. When the carriage 20 is moved for the set distance, the controller C1 at S107 switches the driving condition from the first driving condition to the second driving condition. The controller C1 executes the rest of the FB reading operation by controlling the driving device 30M to generate the driving force based on the second driving condition. Specifically, as illustrated in FIG. 14A, the drive current of the reference current value AS2 is applied to the driving device 30M during this control.

In the image reading apparatus according to the fourth embodiment, the controller C1 selects the first driving condition in a portion of the first platen glass 81 near the left edge 81F illustrated in FIG. 5, i.e., in an area where the first platen glass 81 is easily bent by the load acting on the first platen glass 81, and after the carriage 20 passes through the area where the first platen glass 81 is easily bent, the controller C1 switches the driving condition to the second driving condition. This processing reduces changes in the speed of the carriage 20 and reduces noises from the middle of the FB reading operation.

Accordingly, like the image reading apparatus 1 according to the first through third embodiments, the image reading apparatus according to the fourth embodiment is capable of stably and well performing the FB reading operation even in the case where the load acts on the support surface 81A.

While the first to fourth embodiments have been described above, it is to be understood that the disclosure is not limited to the details of the illustrated embodiments, but may be embodied with various changes and modifications, which may occur to those skilled in the art, without departing from the spirit and scope of the disclosure.

For example, while the load information indicates whether the cover 9 is in the closed state or the spaced state in the first to fourth embodiments, the present disclosure is not limited to this configuration. For example, the load information may contain information such as (i) a value of measurement of a load sensor provided on or near the first supporter and (ii) an amount of depression of a cushioning material bonded to a back surface of the cover 9.

In the first to fourth embodiments, the controller C1 determines that the cover 9 is in the closed state when both of the pivotal movement sensor S1 and the vertical movement sensor S2 are in the ON state, and determines that the cover 9 is in the spaced state when at least one of the pivotal movement sensor S1 and the vertical movement sensor S2 is in the OFF state. However, the present disclosure is not limited to this configuration. For example, the controller C1 may determine whether the cover 9 is in the closed state or the spaced state, only based on the ON/OFF state of the pivotal movement sensor S1. Also, the state of the cover 9 may be classified into four states: the ON states of both of the pivotal movement sensor S1 and the vertical movement sensor S2; the OFF state of only the pivotal movement sensor S1; the OFF state of only the vertical movement sensor S2; and the OFF states of both of the pivotal movement sensor S1 and the vertical movement sensor S2, and different driving conditions may be set for the respective four states. Also, the set angle α1 and the set distance D1 may be modified as needed.

The second driving condition may be set for reducing a length of time required for the FB reading operation or reducing power consumption in the FB reading operation.

What is claimed is:

1. An image reading apparatus, comprising:
    a housing comprising a bottom surface;
    a first supporter supported by the housing so as to be spaced apart from the bottom surface, the first supporter comprising a support surface that supports a document;
    a cover supported by the housing and switchable between a closed state in which the cover covers the support surface and a spaced state in which the cover is spaced apart from the support surface;
    a driving device configured to generate a driving force;
    a mover movable in a space between the bottom surface and the first supporter in a first direction by the driving force transmitted from the driving device;
    an image reader supported by the mover;
    a controller configured to control the image reader and the driving device to perform a reading operation in which the image reader reads an image formed on a document supported by the support surface; and
    a hinge provided between the housing and the cover and configured to couple the cover to the housing such that the cover is pivotable about a pivot axis extending substantially parallel with the support surface,
    the hinge comprising:
        a mount portion mounted on the cover and serving as the pivot axis; and
        a base portion configured to support the mount portion and held by the housing so as to be reciprocable in a second direction substantially perpendicular to the support surface, the base portion being configured to move the cover toward and away from the housing in the second direction between a high position and a low position,
    the image reading apparatus further comprising a first sensor configured to detect whether the cover is located at the high position or the low position,
    the controller being configured to determine, based on detection by the first sensor, whether the cover is located at the high position or the low position, the controller being configured to control the driving device to move the mover with a greater amount of drive current applied to the driving device, when the controller determines that the cover is located at the high position than when the controller determines that the cover is located at the low position.

2. The image reading apparatus according to claim 1, wherein a magnitude of a force acting on the support surface is greater when the controller determines that the cover is located at the high position than when the controller determines that the cover is located at the low position.

3. The image reading apparatus according to claim 1, wherein the first supporter is bent by a greater amount by a force acting on the support surface when the controller determines that the cover is located at the high position than when the controller determines that the cover is located at the low position.

4. The image reading apparatus according to claim 3,
    wherein a reference speed is a speed of the mover moved by the driving force generated by the driving device when the controller determines that the cover is located at the low position in a state in which the force does not act on the support surface of the first supporter, and
    wherein a speed of the mover moved by the driving force generated by the driving device when the controller determines that the cover is located at the high position in the state in which the force acts on the support surface is closer to the reference speed than the speed of the mover moved by the driving force generated by the driving device when the controller determines that the cover is located at the low position in the state in which the force acts on the support surface.

5. The image reading apparatus according to claim 4, wherein when an acceleration of the mover to the reference speed by the driving force generated by the driving device when the controller determines that the cover is located at the low position is defined as a reference acceleration, an acceleration of the mover to the reference speed by the driving force generated by the driving device when the controller determines that the cover is located at the high position in the state in which the force acts on the support surface is less than the reference acceleration.

6. The image reading apparatus according to claim 3, wherein when a rotation speed of the driving device controlled to generate the driving force when the controller determines that the cover is located at the low position is defined as a reference rotation speed, a rotation speed of the driving device controlled to generate the driving force when the controller determines that the cover is located at the high position is less than the reference rotation speed.

7. The image reading apparatus according to claim 1, wherein in the reading operation in a state in which a force acts on the support surface of the first supporter, an amount of change in speed of the mover is less when the controller determines that the cover is located at the high position than when the controller determines that the cover is located at the low position.

8. The image reading apparatus according to claim 1, further comprising:
    a conveyor provided on the cover and configured to convey the document; and
    a second supporter supported by the housing so as to be spaced apart from the first supporter in the first direction, the second supporter comprising a reading surface contactable with the document conveyed by the conveyor,
    wherein the controller is configured to move the mover to a reading position opposed to the second supporter when the controller controls the image reader to read the document conveyed by the conveyor.

9. The image reading apparatus according to claim 8, wherein the controller is configured to, when the controller determines that the cover is located at the high position, perform:
- controlling the driving device to move the mover at least one of at a lesser speed and with the greater amount of the drive current during movement of the mover from a movement start position for a set distance in the first direction, the movement start position being opposed to one of opposite end portions of the first supporter, which one is nearer to the second supporter than another of the opposite end portions; and
- after the movement of the mover for the set distance, controlling the driving device to move the mover at least one of at a greater speed and with a lesser amount of the drive current applied to the driving device than during the movement of the mover from the movement start position for the set distance in the first direction.

10. The image reading apparatus according to claim 1, wherein the housing comprises a first housing and a second housing, and
wherein the first supporter is nipped between the first housing and the second housing.

11. The image reading apparatus according to claim 1, wherein the controller is configured to control the driving device to move the mover with the greater amount of the drive current applied to the driving device when the controller determines that the cover is located at the high position than when the controller determines that the cover is located at the low position, such that a speed of the mover when the controller determines that the cover is located at the high position is equal to that of the mover when the controller determines that the cover is located at the low position.

12. The image reading apparatus according to claim 1, further comprising a second sensor different from the first sensor, wherein the second sensor is configured to detect whether the cover is in the closed state or the spaced state.

13. The image reading apparatus according to claim 12, further comprising a particular actuator configured to be detected by both the first sensor and the second sensor,
wherein the first sensor is configured to detect the particular actuator to detect whether the cover is located at the high position or the low position, and the second sensor is configured to detect the particular actuator to detect whether the cover is in the closed state or the spaced state.

* * * * *